(12) United States Patent
Colenbrander et al.

(10) Patent No.: US 11,648,474 B2
(45) Date of Patent: May 16, 2023

(54) DYNAMIC ADJUSTMENT OF CLOUD GAME DATA STREAMS TO OUTPUT DEVICE AND NETWORK QUALITY

(71) Applicant: Sony Interactive Entertainment LLC, San Mateo, CA (US)

(72) Inventors: Roelof Roderick Colenbrander, Costa Mesa, CA (US); David Perry, Dana Point, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 17 days.

(21) Appl. No.: 17/361,909

(22) Filed: Jun. 29, 2021

(65) Prior Publication Data

US 2021/0322874 A1 Oct. 21, 2021

Related U.S. Application Data

(63) Continuation of application No. 14/641,121, filed on Mar. 6, 2015, now abandoned.

(51) Int. Cl.
*A63F 13/53* (2014.01)
*A63F 13/335* (2014.01)
(Continued)

(52) U.S. Cl.
CPC ............ *A63F 13/53* (2014.09); *A63F 13/323* (2014.09); *A63F 13/335* (2014.09);
(Continued)

(58) Field of Classification Search
CPC ....... A63F 13/53; A63F 13/323; A63F 13/358
See application file for complete search history.

(56) References Cited

U.S. PATENT DOCUMENTS 6,990,104 B1 1/2006 Balachandran et al.
7,458,894 B2 12/2008 Danieli et al.
(Continued)

FOREIGN PATENT DOCUMENTS

| CA | 2798066 A1 | 6/2014 |
| CN | 102696230 A | 9/2012 |

(Continued)

OTHER PUBLICATIONS

Head-up display, dota2.gamepedia.com. Online. Nov. 22, 2013. Accessed via the Internet. Accessed Jan. 8, 2017. <URL: http://wayback.archive.org/web/20131122153039/http://dota2.gamepedia.com/Head-up_display> (Year: 2013).*

(Continued)

*Primary Examiner* — Thomas J Hong
*Assistant Examiner* — Carl V Larsen
(74) *Attorney, Agent, or Firm* — JDI Patent; Joshua D. Isenberg; Robert Pullman

(57) ABSTRACT

In dynamic adjustment of data streamed over a network for display on an output device, display capability information of an output device is requested and received. The display capability information includes information indicating whether the output device is in a horizontal or vertical orientation relative to a user. Two or more data streams configured for display on the output device are formatted such that in a manner consistent with the display capability information and formatted for either vertical or horizontal orientation of the output device. The data streams include a user interface data stream and a separate video data stream. The user interface data and the video data are scaled separately. The streams are delivered to the output device via a network connection by a server to a client device platform used in combination with the output device.

29 Claims, 4 Drawing Sheets

(51) Int. Cl.

| | |
|---|---|
| A63F 13/323 | (2014.01) |
| A63F 13/77 | (2014.01) |
| A63F 13/358 | (2014.01) |
| A63F 13/355 | (2014.01) |

(52) U.S. Cl.
CPC .......... *A63F 13/355* (2014.09); *A63F 13/358* (2014.09); *A63F 13/77* (2014.09)

(56) References Cited

U.S. PATENT DOCUMENTS

| | | | |
|---|---|---|---|
| 8,613,673 | B2 | 12/2013 | Perry et al. |
| 8,834,277 | B2 | 9/2014 | Perry et al. |
| 8,840,476 | B2 | 9/2014 | Perry et al. |
| 8,870,661 | B2 | 10/2014 | Perry et al. |
| 8,888,592 | B1 | 11/2014 | Pereira et al. |
| 8,926,435 | B2 | 1/2015 | Perry et al. |
| 8,968,087 | B1 | 3/2015 | Gault et al. |
| 9,582,238 | B2 * | 2/2017 | Rajamani ............ G06F 3/1454 |
| 2006/0230427 | A1 * | 10/2006 | Kunkel ............... H04N 21/235 725/100 |
| 2006/0252530 | A1 | 11/2006 | Oberberger et al. |
| 2008/0168493 | A1 | 7/2008 | Allen et al. |
| 2009/0044128 | A1 * | 2/2009 | Baumgarten ....... G06F 16/9577 715/738 |
| 2009/0118017 | A1 | 5/2009 | Perlman et al. |
| 2009/0119737 | A1 | 5/2009 | Perlman et al. |
| 2009/0119738 | A1 | 5/2009 | Perlman et al. |
| 2009/0157850 | A1 | 6/2009 | Gagliardi et al. |
| 2010/0030808 | A1 | 2/2010 | Ress et al. |
| 2010/0066804 | A1 | 3/2010 | Shoemake et al. |
| 2010/0071010 | A1 * | 3/2010 | Elnathan .................. H04N 5/06 725/81 |
| 2010/0166065 | A1 | 7/2010 | Perlman et al. |
| 2010/0167816 | A1 | 7/2010 | Perlman et al. |
| 2011/0263332 | A1 * | 10/2011 | Mizrachi ................ A63F 13/12 463/42 |
| 2012/0004042 | A1 | 1/2012 | Perry et al. |
| 2012/0249736 | A1 * | 10/2012 | Barrett ................. H04N 13/139 348/E7.003 |
| 2013/0139091 | A1 * | 5/2013 | Raciborski ............. H04L 65/80 709/217 |
| 2013/0182186 | A1 | 7/2013 | Ikenaga |
| 2013/0260896 | A1 | 10/2013 | Miura et al. |
| 2013/0337916 | A1 | 12/2013 | Saretto et al. |
| 2014/0040959 | A1 | 2/2014 | Oyman |
| 2014/0073428 | A1 | 3/2014 | Perry et al. |
| 2014/0106884 | A1 | 4/2014 | Perry et al. |
| 2014/0155154 | A1 * | 6/2014 | Laakkonen .......... G07F 17/3272 463/31 |
| 2014/0179424 | A1 | 6/2014 | Perry et al. |
| 2014/0179427 | A1 | 6/2014 | Miura et al. |
| 2014/0179428 | A1 | 6/2014 | Miura et al. |
| 2014/0179439 | A1 | 6/2014 | Miura et al. |
| 2014/0187318 | A1 | 7/2014 | Gallizzi et al. |
| 2014/0187323 | A1 | 7/2014 | Perry |
| 2014/0325367 | A1 | 10/2014 | Fear |
| 2014/0361956 | A1 | 12/2014 | Mikhailov et al. |
| 2014/0364208 | A1 | 12/2014 | Perry |
| 2015/0150070 | A1 | 5/2015 | Gibbon et al. |

FOREIGN PATENT DOCUMENTS

| | | |
|---|---|---|
| EP | 2615863 A1 | 7/2013 |
| EP | 2670115 A2 | 12/2013 |
| JP | 2006081895 A | 3/2006 |
| JP | 2008079228 A | 4/2008 |
| JP | 2011198118 A | 10/2011 |
| JP | 2011529591 A | 12/2011 |
| JP | 2014179979 A | 9/2014 |
| TW | 201419792 A | 5/2014 |
| WO | 2009073797 A1 | 6/2009 |
| WO | 2009131507 A1 | 10/2009 |
| WO | 2010012066 A1 | 2/2010 |
| WO | 2012161102 A1 | 11/2012 |
| WO | 2014069771 A1 | 5/2014 |
| WO | 2014123129 A1 | 8/2014 |
| WO | 2014203837 A1 | 12/2014 |

OTHER PUBLICATIONS

Anonymous: "Designing for Device Orientation: From Portrait to Landscape—Smashing Magazine", Aug. 10, 2012 (Aug. 10, 2012), XP055497210, Retrieved from the Internet: URL: https://www.smashingmagazine.com/2012/08/designing-device-orientation-portrait-landscape/ [retrieved on Aug. 3, 20018], pp. 2,3.

Anonymous: "Designing for Device Orientation: From Portrait to Landscape Smashing Magazine", Aug. 10, 2012 (Aug. 10, 2012), Retrieved from the Internet: URL:https://www.smashingmagazine.com/2012/08/designing-device-orientation-portrait-landscape/ [retrieved on Aug. 3, 2018].

BPAI Decision dated Apr. 30, 2021 for U.S. Appl. No. 14/641,121.

Extended European Search Report dated Dec. 14, 2018 for European Patent Application No. 16762259.6.

Extended European Search Report dated Jun. 27, 2018 for European Patent Application No. 16762260.4.

Final Office Action for U.S. Appl. No. 14/641,121, dated Sep. 18, 2019.

Head-up display dota2.gamepedia.com Online Nov. 22, 2013. Accessed via the Internet. Accessed Jan. 8, 2017 CURL: http:/lwayback.archive.org/web/20131122153039/http://dota2.gamepedia.com/Head-up~display>.

International Search Report and Written Opinion for International Application No. PCT/US2016/21053, dated May 23, 2016.

Non-Final Office Action for U.S. Appl. No. 14/641,121, dated Mar. 21, 2019.

Non-Final Office Action for U.S. Appl. No. 14/641,121, dated May 3, 2018.

Non-Final Office Action for U.S. Appl. No. 14/641,121, dated Jan. 13, 2017.

Non-Final/Final Office Action for U.S. Appl. No. 14/641,121, dated Nov. 16, 2018.

Office Action dated Mar. 19, 2019 for Japanese Patent Application No. 2017-544292.

Office Action dated Sep. 25, 2018 for Japanese Patent Application No. 2017-544292.

Office Action for Taiwan Patent Application 105102720 dated Mar. 8, 2017.

Summons to Oral Proceedings dated Jan. 22, 2021 for European Patent Application No. 16762259.6.

Chinese Second Office Action for Application No. 202010485731.5, dated Mar. 30, 2022.

\* cited by examiner

DYNAMIC ADJUSTMENT OF CLOUD GAME DATA STREAMS TO OUTPUT DEVICE AND NETWORK QUALITY

CLAIM OF PRIORITY

This application is a continuation of U.S. patent application Ser. No. 14/641,121, filed Mar. 6, 2015, the entire contents of which are incorporated herein by reference.

FIELD

The present disclosure relates to the dynamic adjustment of data streamed over a network. In particular, aspects of the present disclosure relate to systems and methods for determining the display capabilities of an output device and then formatting two or more streams of data configured for display on the output device.

BACKGROUND

With the increasing prevalence of digital streaming services and various cloud-based computing solutions, the ability to quickly and accurately transfer large amounts of data between remote devices is a critical task. Currently, data streaming services do not take into account the specifications of the device that the data is meant to be displayed on. As a result, scaling and pixel variation between devices can create undesirable display scenarios, for example, text being unreadable on a smaller screen, or an aspect ratio of a display may not be suitable for a certain piece of media.

Additionally, digital streaming services and cloud-based computing solutions may experience limitations in the quality and bandwidth of networks established or used during the transfer of data between remote devices when utilizing applications that are sensitive to latencies, such as video games. These limitations may lead to delays in the data transmission and can thus cause latency, which typically creates inconsistencies during the use of an application. While client devices will attempt to achieve the lowest latency through a variety of methods, inevitably, each client device will experience a different amount of latency due to differences in factors such as the decode speed of transmitted data, render rates, input polling, or even the client's network connection. In some forms of media, the latent display of specific media such as text or user interface (UI) data may be more detrimental to the enjoyment of the user, causing user frustration and perhaps even abandonment of a title or the platform altogether.

Furthermore, on a wide variety of media playing devices available to consumers, the orientation of the display may rapidly change depending on the needs of the user. Certain device orientations may make viewing a media title, which would otherwise be normally viewable in an alternative orientation nearly impossible. Accordingly, there is a need in the art to find alternative means for adjusting and displaying media streamed over a network that takes into account network latency, display orientation, and the specific display capabilities of a wide variety of devices.

SUMMARY

In accordance with certain aspects of the present disclosure, a non-transitory computer readable medium may contain computer readable instructions embodied therein. The instructions may be configured to implement a method when executed. The method may include determining the display capabilities of an output device. Two or more data streams configured for display on the output device may be established and formatted. The data streams may include separate streams for video data and user interface (UI) data. The data streams may then be delivered to an output device.

In accordance with certain implementations of the present disclosure, a method for streaming data to an output device may include determining the display capabilities of the output device. Two or more data streams configured for display on the output device may be established and formatted. The data streams may contain separate information for video data and user interface (UI) data. The data streams may then be delivered to the output device.

In accordance with certain implementations of the present disclosure, a computing system may include at least one processor unit, and at least one memory unit coupled to the at least one processor unit. The at least one processor unit and the at least one memory unit may be configured to perform a method. The method may include determining the display capabilities of an output device. Two or more data streams configured for display on the output device may be established and formatted. The data streams may contain separate information for video data and user interface (UI) data. The data streams may then be delivered to the output device.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

INTRODUCTION

Aspects of the present disclosure relate to systems and methods for the dynamic adjustment of UI and video streaming data in response to varying device types, orientations, and network quality.

In accordance with certain aspects, a client device configured to operate on a network may provide a user with a list of one or more digital assets that can be borrowed from a providing user. The client may then be able to request the use of an asset that can be borrowed from a providing user. The user may then, receive certain rights, such as access to an application or application features, from the providing user. Alternative embodiments provide a method in which a providing user may grant asset rights to another user without first receiving a request.

Implementation Details

Figure 1:
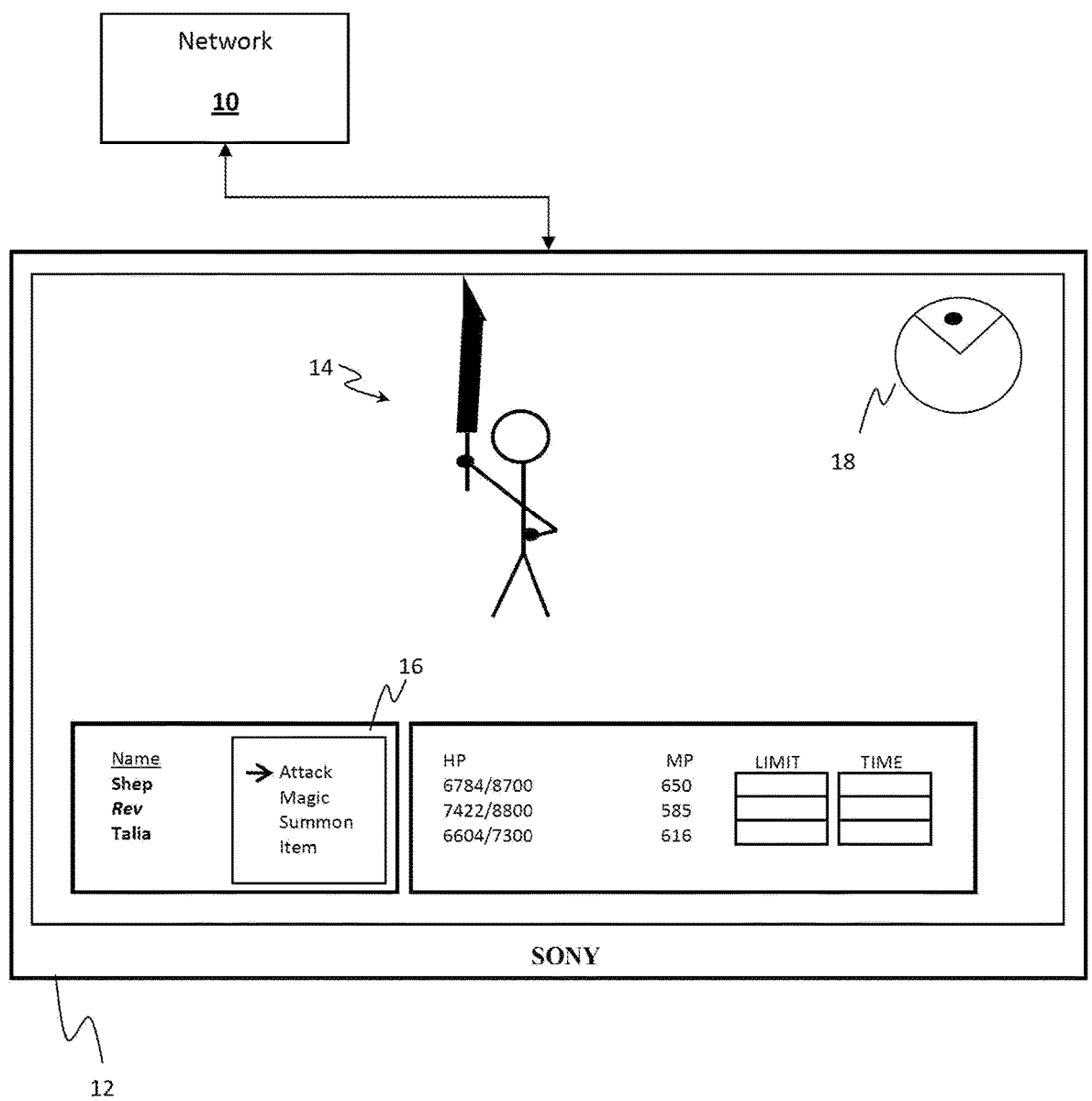
FIG. 1 is an example of a screen shot of a portion of a media title displayed on an output device derived from data streamed over a network, and is intended to illustrate various components of displaying a title.

In FIG. 1, an example is provided of a screen shot of a media title displayed on an output device derived from data streamed over a network 10. This example is intended to illustrate the various components of a streamed title. For example, on the output device 12, various portions of the display may vary in quality and clarity depending on the orientation of the device or the quality of the network connection. For example, video data such as 14 may be clear when displayed independent of the device upon which it is displayed. However, UI data such as text 16 and map data 18 may be difficult to display properly on a smaller screen, or may be rendered unreadable or unusable when formatted to fit a smaller display.

Figure 2:
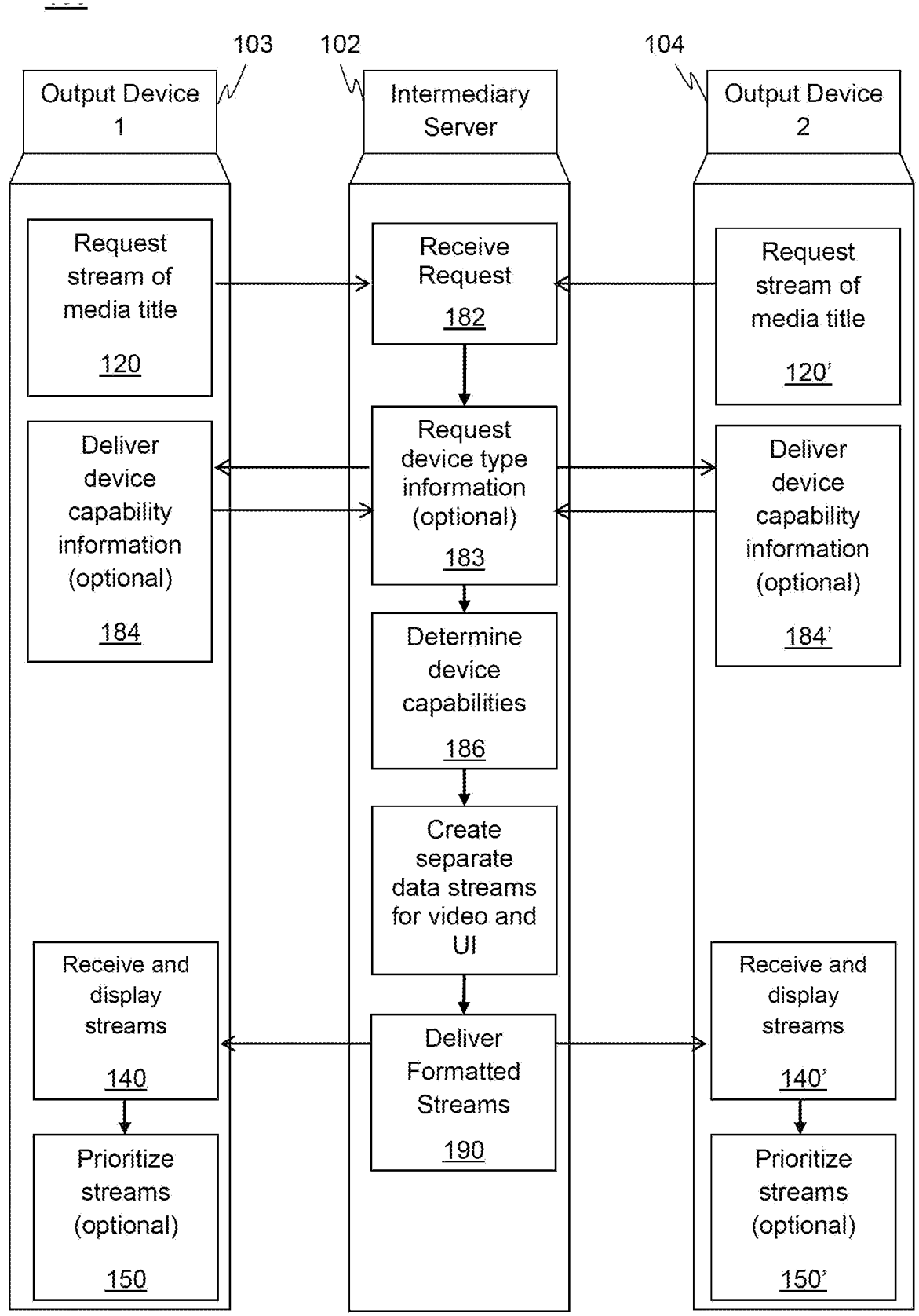
FIG. 2 is a flow diagram of an example system in accordance with certain aspects of the present disclosure.

Turning now to FIG. 2, an illustrative example is provided of how a media title may be displayed on various devices from data streamed over a network 100. In particular, FIG. 2 depicts an example process flow for providing an output device with several data streams in accordance with certain implementations of the present disclosure. It is noted that the example method of providing an application asset in FIG. 2 may have one or more aspects in common with the methods indicated in FIGS. 4 and 5. It is also important to note that the example of FIG. 2 is only a simplified example for purposes illustrating only certain aspects of how data streams may be provided in accordance with the present disclosure.

At the outset, it is important to note that in this example, a data stream is provided to an output device that is requesting a stream from a server containing media information, but data may be requested from and delivered by alternative sources. In this example, as shown in FIG. 2, a user utilizing an output device 103 requests the stream of a media title from a server 102. The server receives this request 182 and determines the capabilities 186 of the output device 103 from a list of compatible devices. Relevant capabilities may include parameters such as screen size in pixels, physical screen dimensions, screen resolution, color format (e.g., 8-bit, 15-bit, 16-bit, 24-bit, 30-bit, 36-bit, or 48-bit color), and the like.

Additional examples of parameters which may be of use include, but are not limited to the following: pixel aspect ratio (a pixel is typically assumed to be square with the same width and height. This is not necessarily true especially for old SD television signals); color space information (RGB, YUV, etc.), gamma correction information, screen orientation, display backlight level ('brightness level'), refresh rate of the display. With respect to refresh rate, is may be useful to know the maximum refresh rate (60 Hz), but the device may also support lower or even variable refresh rates.

Some of these parameters could change over time. For example, for handheld devices such as tablets and smartphones, orientation may change. It is also possible for the display capabilities to change when streaming to one device that is locally connected to a different display device. For example, a user who is streaming video to a device such as a tablet or phone may suddenly connect the device to a 4K display. This can change some of the capabilities.

There may also be some other relevant graphics processing unit (GPU) parameters. For example, some GPUs (especially on embedded platforms) have support for video overlays. Specifically, a frame may have multiple drawing layers, which are somehow combined ("composited") before the frame is output to the display. This can allow for independent rendering of video and UI. For example, the video stream could be rendered on a different layer than the UI. The UI and video streams can have different update frequencies and both don't have to 'wait' for each other. For example, digital televisions use overlays to layer a system menu system on top of the 'TV image'.

In alternative embodiments, the server may request the device information 183 from the output device when the display capabilities are unknown, and the output device may in turn deliver that information 184 to the server. For example, the output device may include one or more sensors, e.g., an inertial sensor and/or user-facing camera, that allow the output device to sense the orientation of a display screen relative to a user. The display screen may be rectangular but have a non-square aspect ratio (ratio of width to height). The server 102 may request that the output device indicate whether it is in a horizontal or vertical orientation relative to the user so that the data to be streamed may be best formatted for presentation at that orientation.

Information regarding device capabilities (e.g., whether device supports 480p, 720p . . . ) give the server information on what is technically possible. It would also be useful for the server to know certain current settings of the device such as orientation and output resolution. Other information such as color depth may be less important, because it can be adjusted at the client device or the server would dictate this information for compression efficiency reasons or to reduce required bandwidth.

The server 102 may also request information about the quality of the network 100 between the server and the output device 103. Such information may include parameters such as network latency, available network bandwidth, packet loss, or network protocol. This information can be used in formatting the data streams 188. For example, some network protocols, e.g., Uniform Datagram Protocol (UDP) are highly unreliable. If the server 102 knows that the network 100 uses UDP the streams 188 can be configured to include Forward Error Correction (FEC) packets that the output device 103 can use to recover lost data packets.

Streaming technology often uses FEC techniques. Before starting streaming to a client device, a server sets a bandwidth budget, e.g., 8 Mbps for the stream. To set the bandwidth budget it is useful for the server to pick some client device settings such as video resolution, frame rate and compression settings.

During streaming the server can monitor bandwidth and based on network parameters such as bandwidth and packet loss and adjust our video resolution, frame rate and compression settings accordingly. Similar settings can be adjusted for audio streaming, which may become more important. Knowing the audio settings allows the server to optimize the audio stream for, e.g., a six-channel surround sound setup (e.g., 5.1 surround sound) or a stereo setup.

Some streaming technology reduces frame rate or resolution somewhat crudely. For example, some video game streaming systems capture video from HDMI, so if a game is generating 60 fps and the streaming rate needs to be reduced to 30 fps, the streaming server simply throws frames away. In addition, if resolution needs to be reduced, the server can just scale the video frame received from the game. By way of example, the game may be generating video at 720P and if the server 102 needs to stream at 540P, the frame is just scaled in software.

Servers for some applications, such as online video games, often run the application software on different hardware than the hardware used to handle streaming of video to the client devices. The streaming server and application hardware may be located in a data center and connected by a local area network. According to aspects of the present disclosure, formatting the video data could be done using the application that generates video frames that are used for the video stream. By way of example, and not by way of limitation, the streaming server could notify the hardware running the application that it needs to reduce frame rate or display resolution. The application can then adjust the frame rate or resolution or otherwise adjust the video formatting for the output device 103. The application that generates the video frames often can do a better job of adjusting frame rate, display resolution or other video formatting parameters. In addition, formatting the video this way could even save a little bit of electrical power (a lower resolution or framerate is less intensive for a server and hence uses less power).

Once the device display capability information is determined, the server may create separate streams for the video and UI information 188. This step is performed so that the UI and video data information can be formatted separately on the output device 103, allowing for the separate scaling of UI and video data to ensure that, all aspects of the streamed title are clear and useable. These formatted streams are delivered 190 to the output device 103 where they are received and displayed 140 in a manner consistent with the display capabilities of the output device. In alternative embodiments, the output device may prioritize the display of the streams 150. By way of example, and not by way of limitation, if each aspect of the UI data is contained in a separate stream, the output device may prioritize the display of the streams in the order of (text data, video data, map data, etc.) so that certain aspects of the display maintain clarity during times of network latency while others become less defined.

As an example, a 'game' stream for an online video game may be a compressed video stream. The UI stream for the game may not necessarily be a video stream, but as noted above can be text, bitmap data, vectored graphics and other types of data. These types of data may be shared with the output device 103. In some implementations, the output device 103 may already have some of the data locally, e.g., as part of the data 236' in the memory 232' or cache 244'. For example, the fonts used to render text may already be available on the client. In some implementations, the output device 103 may be able to configure the UP based on user settings. In such an implementation the user could, e.g., override bitmaps or fonts with whatever data is already stored on the output device 103 to create something like a game 'mod' which is often used in massive multiplayer online games (MMOs).

The illustration in FIG. 2 also provides an example of a second user requesting to stream a media title from a server, and is provided to show that the data may be streamed to various devices which each have their own respective data stream 140' such that the data is received and displayed in a manner consistent with the display capabilities of a multitude of output devices.

It is emphasized that the example depicted in FIG. 2 is provided for purposes of illustration only, in order to highlight certain aspects of the present disclosure. In practice, implementations of the present disclosure may factor in additional or alternative considerations not depicted by the example of FIG. 2, and may be more complex than the simplified scheme depicted in FIG. 2.

Figure 3:
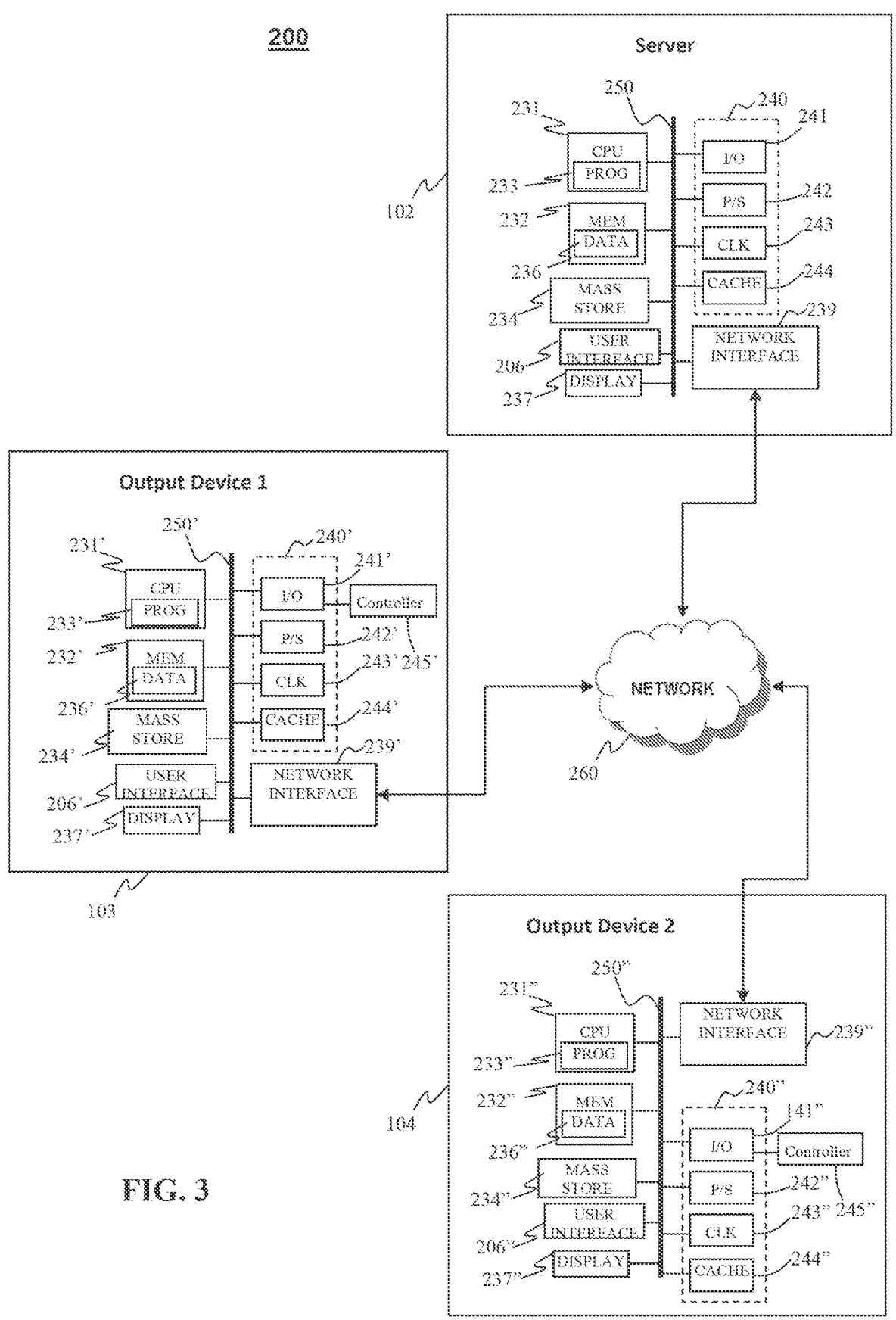
FIG. 3 is a block diagram of an example system in accordance with certain aspects of the present disclosure.

Certain implementations of aspects of the present disclosure include systems configured for the dynamic adjustment of streamed content. By way of example, and not by way of limitation, FIG. 3 depicts a distributed computing system that includes three devices 102, 103, and 104, and the computing systems 102, 103, and 104 are configured to transfer data over a network in accordance with certain aspects of the present disclosure. In certain implementations, the device 102 may be configured to execute instructions that have one or more aspects in common with those described with respect to FIG. 2 and/or FIG. 4. In certain implementations, the devices 103 and 104 may be configured to execute instructions that have one or more aspects in common with one or more of those described above with respect to FIG. 2 or below with respect to FIG. 5. Each of the devices 102, 103, and 104 may be configured with suitable software and/or hardware to implement various aspects of the methods described herein. Each of the devices 102, 103, and 104 may be a server, an embedded system, mobile phone, personal computer, laptop computer, tablet computer, portable game device, workstation, game console, wearable devices such as a smart watch, "dongle" devices and the like. As used herein, the term "dongle device" refers to a device that plugs into other equipment, such as a computer or television, to add functionality to the equipment. Such functionality may include as copy protection, audio, video, games, data, or other services that are available only when the dongle is attached. Examples of dongle devices include, but are not limited to internet content streaming devices and infrared remote-control adapters available for "smart" mobile phones. The output devices 103, 104 have certain components in common, with the server 102. In FIG. 3 components of the server 102 are denoted by reference numerals without primes, corresponding components of output device 103 are denoted by the same reference numerals with primes (') and corresponding components of output device 104 are denoted by the same reference numerals with double primes (').

In accordance with certain implementations, the device 102 may be a server configured to format and provide media streaming data, and the devices 103 and 104 may be an output device utilized by a user who wishes to display a media title. The server 102 may be configured to create and format media 188 and deliver the data 190 to an output device 103 or 104 over a network 260, e.g., using an internet connection or a local area network connection. It is noted that the network 260 need not be an internet connection. In some implementations streaming may take place from one device at a given location to another device in that location via a local area network. Furthermore, even if the network 260 is a wide area network, it may be implemented by technology other than the internet, such as, a cable network.

The data streams 188 may be separately formatted for respective devices 103 or 104 even if the media title requested is the same, as the device capabilities 186 of the respective output devices may vary. By way of example, and not by way of limitation, the data streams 188 may include streams for video data, UI data, text, inventory data, map data, or audio data. In some implementations certain types of data streams may be compressed to reduce the number of bits of data that need to be transmitted in the stream. In particular, video data and audio data are commonly compressed prior to being transmitted.

Each of the devices 102, 103, and 104 may include one or more processor units 231, 231', 231" which may be configured according to well-known architectures, such as, e.g., single-core, dual-core, quad-core, multi-core, processor-co-processor, cell processor, and the like. Either of the devices Each of the devices 102, 103, and 104 may also include one or more memory units 232, 232', 232" (e.g., RAM, DRAM, ROM, and the like). The processor unit 231, 231', 231" may execute one or more programs 233, 233', 233" which may be stored in the memory 232, and the processor 231, 231', 231" may be operatively coupled to the memory 232, 232', 232", e.g., by accessing the memory via a data bus 250, 250', 250". The memory unit 232, 231' 231" may include data 236, 236', 236" and the processor unit 231, 231', 231" may utilize the data 236, 236', 236" in implementing the program 233, 233', 233". The data 236, 236', 236" for each of the devices 102, 103, and 104 may include, e.g., a request for streaming data 120 transmitted from an output device 103 or 104 to the server 102, and a specially formatted set of data streams 188 for delivery 140 from the server 102 to an output device 103 or 104 according to various aspects of the present disclosure. The program 233, 233', 233" may include optionally instructions that, when executed by a processor, perform one or more operations associated with requesting streaming data for a media title 120, determining the capabilities of the output device from which the request was received 186, creating and formatting two or more video streams which respectively contain video and UI data 188 for display on the output device 103 or 104, or receiving and displaying data streams formatted 140 to best utilize the display capabilities of the output device 103 or 104; e.g., a method having one or more features in common with the methods of FIGS. 2, 4, and/or 5. For example, the program 233, 233', 233" of the server 102 may include instructions that, when executed by the processor 231, 231', 231", cause the server to format and deliver streaming data to the at least one recipient device 103 or 104, in accordance with aspects of the server side of the method depicted in FIG. 2 and/or the sending of streaming data. In alternative embodiments, the program 233, 233', 233" of the server 102 may include instructions that, when executed by the processor 231, 231', 231", cause the server to request display capability information from the at least one recipient device 103 or 104, in accordance with aspects of the server side of the method depicted in FIG. 2 and/or the sending of streaming data. The program 233, 233', 233" of the output device 103 or 104 may include instructions that, when executed by the processor 231, 231', 231", cause the output device to request streaming data 120 that can then be provided by the server 102 in accordance with aspects of the output device side of the method depicted in FIG. 2 and/or the sending of streaming data. In alternative embodiments, the program 233, 233', 233" of the output device 103 or 103 may include instructions that, when executed by the processor 231, 231', 231", cause the output device to deliver display capability information 184 to the server 102 in accordance with aspects of the output device side of the method depicted in FIG. 2 and/or the sending of streaming data.

Each of the devices 102, 103, and 104 may also include well-known support circuits 240, 240', 240", such as input/output (I/O) circuits 241, 241', 241" (which in the case of output devices 103, 104 may be coupled to a controller 245', 245"), power supplies (P/S) 242, 242', 242", a clock (CLK) 243, 243', 243", and cache 244, 244', 244", which may communicate with other components of the system, e.g., via the bus 250, 250', 250". Each of the devices 102, 103, and 104 may optionally include a mass storage device 234, 234', 234" such as a disk drive, CD-ROM drive, tape drive, flash memory, or the like, and the mass storage device 234, 234', 234" may store programs and/or data. Each of the devices 102, 103, and 104 may also optionally include a display unit 237, 237', 237". The display unit 237, 237'. 237" may be in the form of a cathode ray tube (CRT), flat panel screen, touch screen, or other device that displays text, numerals, graphical symbols, or other visual objects. Each of the devices 102, 103, and 104 may also include a user interface 206, 206', 206" to facilitate interaction between the device 102/103 or 104 and a user. The user interface 206, 206', 206" may include a keyboard, mouse, light pen, game control pad, touch interface, or other device. The user interface may also include an audio VO device, such as a speaker and/or microphone.

A user may interact with either of the computer systems through the user interface 206, 206', 206". By way of example, the server may 102 may be a cloud gaming server, and the output device 103 or 104 may be a cloud gaming client, and a video game user may interact with a video game executed by the server 102 and streamed to the output device 104 through the user interface 206, 206', 206". Portions of the user interface 206, 206', 206" may include a graphical user interface (GUI) that can be displayed on the display unit 237, 237', 237" in order to facilitate user interaction with the system 102/103 or 104. The system 102/103 or 104 may include a network interface 239, 239', 239", configured to enable the use of Wi-Fi, an Ethernet port, or other communication methods. The network interface 239, 239', 239" may incorporate suitable hardware, software, firmware or some combination thereof to facilitate communication via a telecommunications network 260, and may support data transport using an unreliable protocol in accordance with certain aspects of the present disclosure. The network interface 239, 239', 239" may be configured to implement wired or wireless communication over local area networks and wide area networks such as the Internet.

Figure 4:
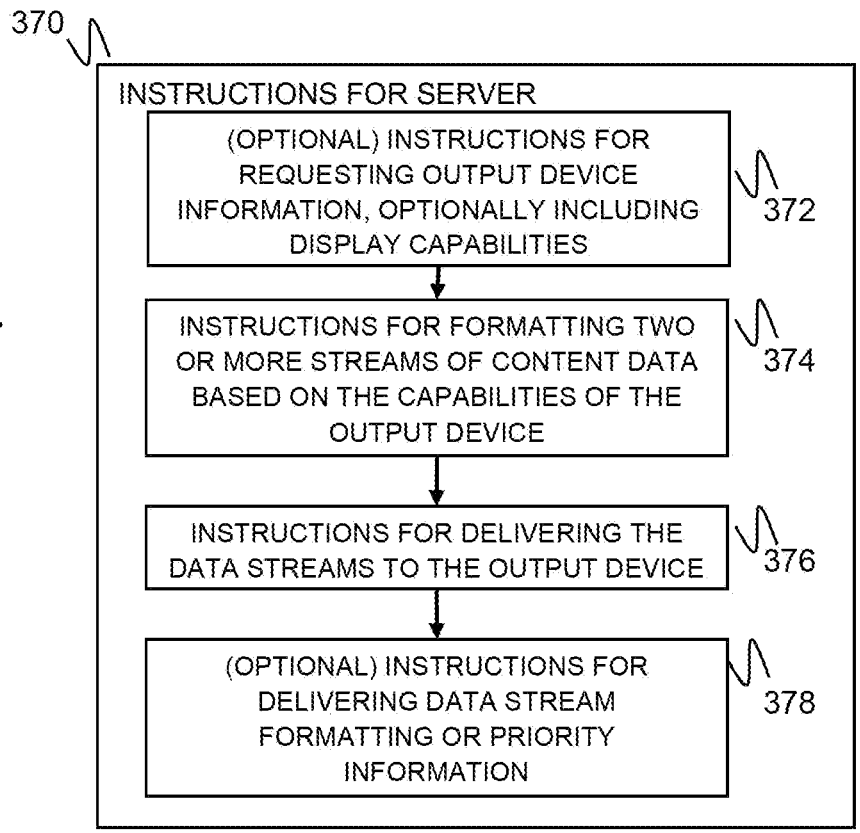
FIG. 4 is a flow diagram of an example asset management technique from the server side in accordance with certain aspects of the present disclosure.

As shown in FIG. 4, a set of server-side instructions 370 may be implemented, e.g., by the server 102. The server instructions 370 may be formed on a nontransitory computer readable medium such as the memory 232, 232', 232" or the mass storage device 234, 234', 234". The server side instructions 370 may also be part of the process control program 233, 233', 233". As indicated at 372 the server instructions 370 may include instructions for requesting output device information, optionally including output device display capabilities 183 to be received from or more client devices 103 or 104 over a network 260. The instructions 370 may include instructions 374 for formatting two or more streams of content data 188 based on the capabilities of the output device. Thereafter, at 376 the instructions may include instructions for delivering 190 the data streams to the output device 103 or 104 and subsequently, at 378 may include instructions for delivering data stream formatting or priority information to the respective output device.

Figure 5:
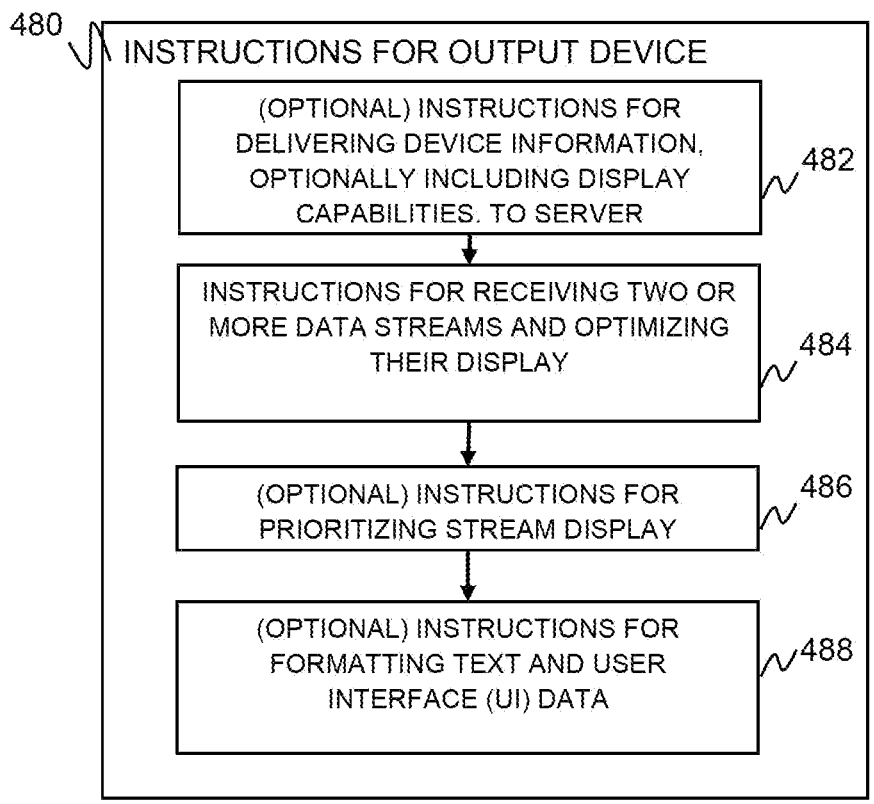
FIG. 5 is a flow diagram of an example asset management technique from the output device side in accordance with certain aspects of the present disclosure.

As shown in FIG. 5, a set of output device instructions 480 may be implemented, e.g., by the output device 103 or 104. The output device instructions 480 may be formed on a nontransitory computer readable medium such as the memory 232, 232', 232" or the mass storage device 234, 234', 234". The output device instructions 480 may also be part of the process control program 233, 233', 233". As indicated at 482, the instructions 480 may include instructions for delivering output device information, optionally including output device display capabilities 183 to be delivered by the or more client devices 103 or 104 over a network 260. The instructions 470 may include instructions 474 for receiving 140 two or more streams of content data 188 based on the capabilities of the output device. Thereafter, at 476 the instructions may include instructions for prioritizing 150 the display of the data streams on the output device 103 or 104 and subsequently, at 478 may include instructions for formatting text or other user interface (UI) such that the streamed content is displayed in a manner consistent with the display capabilities of the output device 103 or 104.

The above components may be implemented in hardware, software, firmware, or some combination thereof.

Although the examples described above assume a game stream and a UI stream, which are combined on the client side, additional streams, example a video chat stream, may be included. Such additional streams may come peer-to-peer from other users' client devices and could be combined by the client devices. In some implementations, the program 233 on the server 102 may be aware that there is a video chat stream between output devices 103 and 104 and could reserve resources for handling this stream. For latency reasons the server 102 could coordinate a peer-to-peer (p2p) session to let the client devices 103, 104 combine the video chat stream with the other streams. There may be types of local content which could be composited by the client devices.

Aspects of the present disclosure allow for formatting and streaming of data in different formats that are displayed together to be optimally displayed on different devices.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A non-transitory computer readable medium having processor-executable instructions embodied therein, wherein execution of the instructions by a processor causes the processor to implement a method, the method comprising:
   a) requesting display capability information of an output device, the display capability information comprising information on display capabilities of the output device and information indicating whether the output device is in a horizontal or vertical orientation relative to a user;
   b) receiving the display capability information of the output device;
   c) formatting two or more data streams configured for display on the output device such that the content data is formatted in a manner consistent with the display capability information of the output device and formatted for either vertical or horizontal orientation of the output device indicated by the display capability information, wherein the two or more data streams include a data stream for user interface data and a separate data stream for video data, wherein the user interface data and the video data are scaled separately; and
   d) delivering the two or more streams of content data to the output device via a network connection, wherein the data streams are delivered by a server to a client device platform used in combination with the output device, wherein the user interface data is configured to be used by a user interface to facilitate interaction between the client device platform and the user.

2. The non-transitory computer readable medium of claim 1, wherein the two or more data streams include a data stream containing compressed data.

3. The non-transitory computer readable medium of claim 1, wherein the two or more streams of content include a data stream containing data to be displayed as text.

4. The non-transitory computer readable medium of claim 1, wherein the two or more streams of content include a data stream containing data to be displayed as a heads-up-display (HUD).

5. The non-transitory computer readable medium of claim 1, wherein the two or more data streams include a data stream containing data to be displayed as inventory information.

6. The non-transitory computer readable medium of claim 1, wherein the two or more data include a data stream containing data to be displayed map information.

7. The non-transitory computer readable medium of claim 1, wherein the display of one data stream is prioritized over the display of another.

8. The non-transitory computer readable medium of claim 7, wherein the prioritization of display is determined by the quality of the network connection.

9. The non-transitory computer readable medium of claim 1, wherein the client device platform is a gaming console.

10. The non-transitory computer readable medium of claim 1, wherein the client device platform is a computer.

11. The non-transitory computer readable medium of claim 1, wherein the client device platform is a cellular phone.

12. The non-transitory computer readable medium of claim 1, wherein the client device platform is a tablet.

13. The non-transitory computer readable medium of claim 1, wherein the client device platform is a hand-held computing device.

14. The non-transitory computer readable medium of claim 1, wherein the client device platform is a set top box.

15. The non-transitory computer readable medium of claim 1, wherein the client device platform is a telephonic system.

16. The non-transitory computer readable medium of claim 1, wherein the client device platform is a dongle device.

17. The non-transitory computer readable medium of claim 1, wherein the client device is configured to query the output device to determine the display capabilities of the output device and deliver this information to the server.

18. The non-transitory computer readable medium of claim 1, wherein the content data includes a video portion of a video game.

19. The non-transitory computer readable medium of claim 1, wherein the content data is a stream of a computer program session running on a remote machine.

20. The non-transitory computer readable medium of claim 1, wherein the output device is a television.

21. The non-transitory computer readable medium of claim 1, wherein the output device is a projector.

22. The non-transitory computer readable medium of claim 1, wherein the output device and the client device platform are the same device.

23. The non-transitory computer readable medium of claim 1, wherein b) includes formatting the video data with an application used to generate video frames for the data stream for video data.

24. The non-transitory computer readable medium of claim 1, wherein the two or more streams include a game stream and a user interface stream.

25. The non-transitory computer readable medium of claim 24, wherein the two or more streams include a game stream, a user interface stream and one or more additional streams.

26. The non-transitory computer readable medium of claim 24, wherein the two or more streams include a game stream, a user interface stream and a video chat stream between a first client device and a second client device.

27. The non-transitory computer readable medium of claim 24, wherein the two or more streams include a game stream, a user interface stream and a video chat stream between a first client device and a second client device, wherein the method further comprises coordinating a peer-to-peer session between the first and second client devices to let the first and second client devices combine the video chat stream with the game stream and the user interface stream.

28. On a server configured to operate on a network, a method, comprising:
   a) requesting display capability information of an output device, the display capability information comprising information on display capabilities of the output device and information indicating whether the output device is in a horizontal or vertical orientation relative to a user;
   b) receiving the display capability information of the output device;
   c) formatting two or more data streams configured for display on the output device such that the content data is formatted in a manner consistent with the display capability information of the output device and formatted for either vertical or horizontal orientation of the output device indicated by the display capability information, wherein the two or more data streams include a data stream for user interface data and a separate data stream for video data, wherein the user interface data and the video data are scaled separately; and
   d) delivering the two or more streams of content data to the output device via a network connection, wherein the data streams are delivered by a server to a client device platform used in combination with the output device, wherein the user interface data is configured to be used by a user interface to facilitate interaction between the client device platform and the user.

29. A system comprising:
   a processor, and
   a memory coupled to the processor;
wherein the processor is configured to perform a method, the method comprising:
   a) requesting display capability information of an output device, the display capability information comprising information on display capabilities of the output device and information indicating whether the output device is in a horizontal or vertical orientation relative to a user;
   b) receiving the display capability information of the output device;
   c) formatting two or more data streams configured for display on the output device such that the content data is formatted in a manner consistent with the display capability information of the output device and formatted for either vertical or horizontal orientation of the output device indicated by the display capability information, wherein the two or more data streams include a data stream for user interface data and a separate data stream for video data, wherein the user interface data and the video data are scaled separately; and
   d) delivering the two or more streams of content data to the output device via a network connection, wherein the data streams are delivered by a server to a client device platform used in combination with the output device, wherein the user interface data is configured to be used by a user interface to facilitate interaction between the client device platform and the user.

* * * * *